(No Model.) 2 Sheets—Sheet 1.

A. GRIEVES & T. F. FRAZIER.
METHOD OF WELDING CYLINDERS.

No. 509,526. Patented Nov. 28, 1893.

WITNESSES

INVENTORS,
Andrew Grieves
Thomas Frank Frazier
by W. Bakewell & Sons
their attorneys

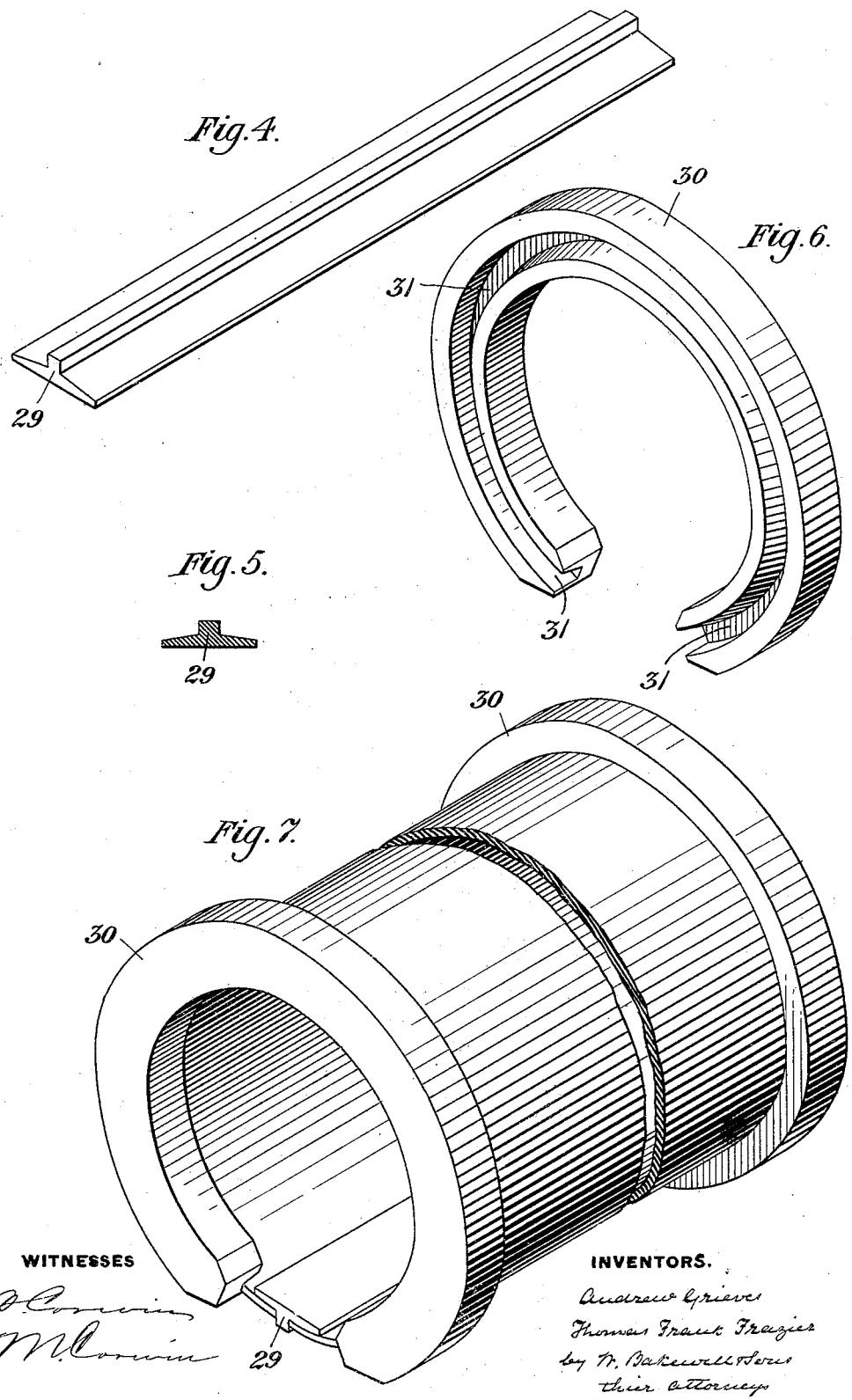

UNITED STATES PATENT OFFICE.

ANDREW GRIEVES AND THOMAS FRANK FRAZIER, OF ALLEGHENY, PENNSYLVANIA.

METHOD OF WELDING CYLINDERS.

SPECIFICATION forming part of Letters Patent No. 509,526, dated November 28, 1893.

Application filed March 27, 1893. Serial No. 467,727. (No specimens.)

*To all whom it may concern:*

Be it known that we, ANDREW GRIEVES and THOMAS FRANK FRAZIER, of Allegheny, in the county of Allegheny and State of Pennsylvania, have invented a new and useful Improvement in Methods of Welding, of which the following is a full, clear, and exact description.

Our invention relates to an improvement in welding cylindrical bodies, such as boilers, boiler-rings, and other cylinders formed of sheet metal, and it consists in placing a strip of metal between the edges of the cylinder to be welded, evenly heating the meeting parts, and then passing these parts between rolls or other welding apparatus, so as to weld the parts together, substantially as hereinafter described.

We will now describe our invention so that others skilled in the art may employ the same, reference being had to the accompanying drawings, forming part of this specification, in which—

Figure 1:
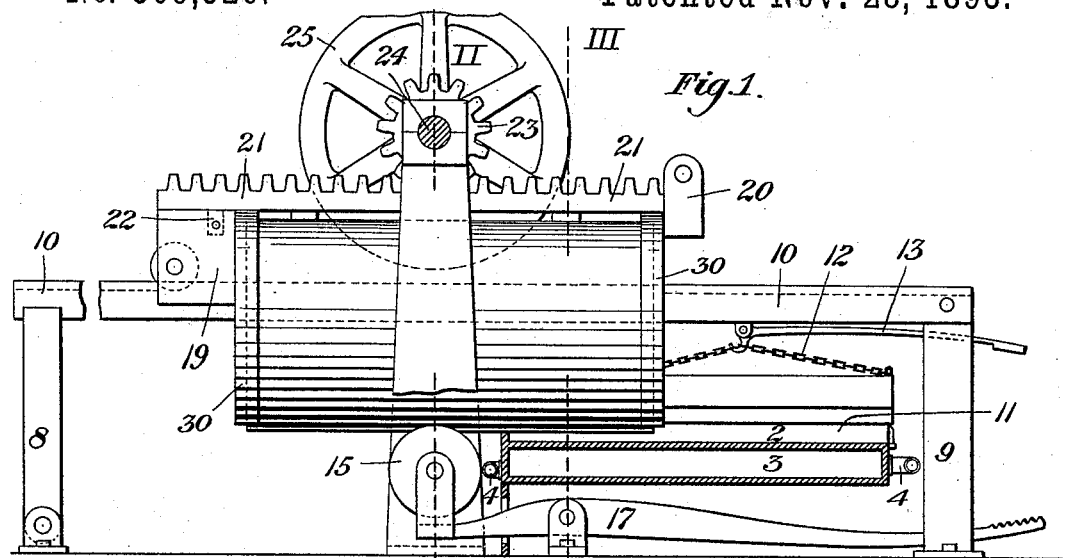
Figure 2:
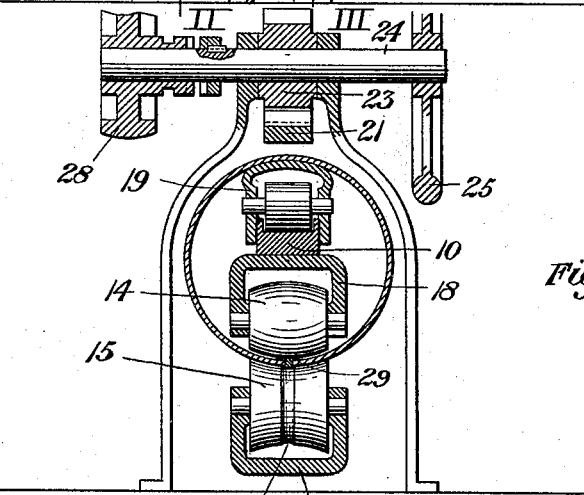
Figure 3:
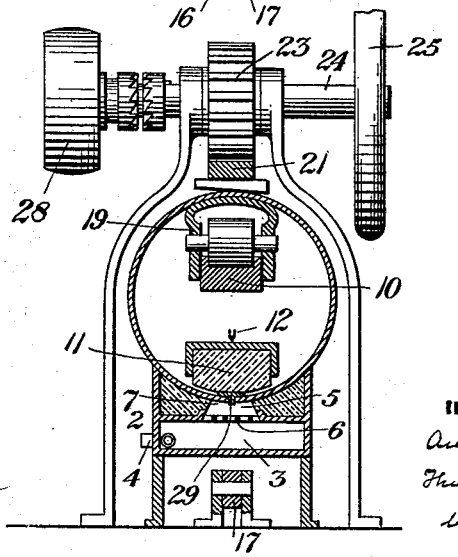

Figure 1 is a side elevation of apparatus which may be employed in the use of our improved method. Fig. 2 is a cross-sectional view on the line II—II of Fig. 1. Fig. 3 is a like view on the line III—III of Fig. 1. Fig. 4 is a perspective view of the welding strip. Fig. 5 is a cross-sectional view of the same. Fig. 6 is a detached view of the brace-rings; and Fig. 7 is a perspective view of the shell, the brace-rings and strip being in position for welding.

Like symbols of reference indicate like parts in each of the views.

This apparatus consists in a furnace or heater, adapted to heat the outer surfaces of the edges of the seam of the boiler-shell or cylinder, a radiator for the purpose of heating the interior edges of the boiler seam, and rolls for guiding the shell and welding the seam as the shell is drawn from the furnace. The furnace or heater is formed of a cast-iron box 2, in the bottom of which is an air or blast chamber 3 into which the blast-pipes 4 open for the purpose of supplying air to the furnace. Above the air-box is the fire-chamber 5, the bottom of which is formed by suitable grate-bars 6, while the sides are formed of fire brick tiles, which slope upwardly at an angle leaving the opening 7 along the top of the furnace. These tiles are concave on their upper faces, so as to coincide with the form of the shell to be welded. At each end of the furnace, on a line with the longitudinal opening 7, is an upright standard 8, 9, and extending from the top of one to the top of the other is a horizontal bar or track 10. Suspended from this bar, over the entire length of the opening 7, is a series of fire-brick tiles 11, which are united and held in position by a suitable casing, and form a radiator when heated by the heat passing through the opening 7. This radiator may be so suspended by means of the chain 12 and the lever 13, that it may be raised from or lowered nearer to the opening in the furnace. The rear end of the furnace is closed with fire-brick, and the forward end is closed by an air-tight door, air for supporting combustion in the furnace being supplied from the air-box 3. The construction and arrangement of the parts of this furnace may be varied according to the kind of fuel to be employed.

The welding devices are arranged at a point at the rear end of the furnace, and they consist of two rolls 14 and 15, the lower one of which has a concave face having a shallow annular groove 16, and is journaled at the end of a lever 17, so that the roll may be raised and lowered, or the rolls may be adjusted in relation to each other by means of screws or other suitable means, in which case the lever is omitted, and the upper roll, having a convex face, is journaled in a bracket 18, which projects down from the horizontal bar 10, so that the lower face of this roll shall be about on a level with the concave surface of the top of the furnace. Along the top of the bar 10 is a guide groove in which the wheels of the carriage 19 travel. This carriage is designed to support and carry the shell, and at one of its ends there is a bracket or hinge 20, which projects above the outer face of the shell, and to which is hinged a toothed bar or rack 21, which extends longitudinally over the shell and is secured at its other end by a projecting piece 22, which fits in a slot in the top of the carriage, and is secured by a pin or key passing through the carriage and the projection. Power is applied to the rack 21, so as to move the shell from the furnace to and through the welding rolls, by a pinion 23 which gears with the rack and is keyed to the shaft 24, which is provided with the hand-wheel 25 and the power-wheel 28. The standard 8 at the rear end of the furnace is removably secured to the bar or track 10, so that the shell may be passed over the track in placing it in its position on the carriage.

In welding cylinders and boiler shells by our improved method, the shell or cylinder is formed of sheet metal in the usual manner, the edges, where the seam is to be formed, being brought close together, leaving a small space between the edges. Within this space we place a T-shaped strip 29 of steel or other suitable metal, in lengths equal to the length of the shell or cylinder, the flange of the T extending through the space and projecting beyond the outer surface of the shell, and the head of the T resting against the inner face of the shell. When this strip has been inserted, the sides of the shell are braced by means of the open rings 30, which are provided on their inner faces with the tapering annular grooves 31 within which the ends of the shell fit. The furnace and radiator 11 having been heated, the shell is placed on the carriage 19 and secured between the carriage and the rack 21, the strip 29 being on a vertical line with the groove 16 of the roller 15 and the opening in the top of the furnace, and the carriage is moved along the track 10 by the rack and pinion until the seam of the shell is brought below the radiator 11 and over the top opening of the furnace, where it is allowed to remain until the edges of the shell and the T-strip 29 are brought to a welding heat. These parts having been heated, power is applied to the shaft 24, and the carriage is driven toward the welding rolls, between which rolls the heated T-strip and edges of the shell pass, the projecting edge of the flange of the strip fitting in the groove 16 of the roll 15, and, at the same time, pressure is applied to the lever 17, which causes the roll 15 to bear against the heated metal and press the parts against the inner or upper roll 14 and thus weld the parts together, the projecting edge of the flange being flattened down on the face of the shell.

Although we have described a form of apparatus which may be employed in our improved method, we do not desire to limit ourselves thereto, as other forms of welding devices may be substituted therefor.

The advantages of our invention will be apparent to those skilled in the art. The T-strip being firmly welded to the edges of the cylinder forms a tight and strong joint, and reinforcing the cylinder at this point makes what is ordinarily the weakest part the strongest.

We are aware that in welding pipe seams and the seams of thimble-skeins, star-shaped, H-shaped, and delta-shaped strips of metal have been used. Such strips, however, are inapplicable for use in connection with boiler and other cylindrical shells, owing to the fact that the second head of the longitudinal rivet, in order to make a tight joint in a thin shell, must be formed solely by the welding or riveting operation, and the first or original head must be distinct from the web and have a bearing on the face of the shell. The strips employed by us therefore have a distinct single head and a single web extending at right angles therefrom, and thus not only weld but also rivet the edges of the shell to each other.

Having thus described our invention, what we claim, and desire to secure by Letters Patent, is—

The herein-described method of forming cylinders, consisting in bending the shell to the desired shape, inserting a T-shaped longitudinal strip of metal between and over the adjacent edges of the shell, bracing the ends of the shell, heating the edges of the shell and the strip, and welding the same; substantially as described.

In testimony whereof we have hereunto set our hands.

ANDREW GRIEVES.
THOMAS FRANK FRAZIER.

Witnesses:
W. B. CORWIN,
H. M. CORWIN.